Dec. 6, 1966  SEIZO JINNO  3,289,651
COOLING DEVICE FOR ROTARY PISTON ENGINES
Filed Dec. 2, 1964  2 Sheets-Sheet 1

Inventor
Seizo Jinno
By Stevens, Davis, Miller & Mosher
ATTORNEYS

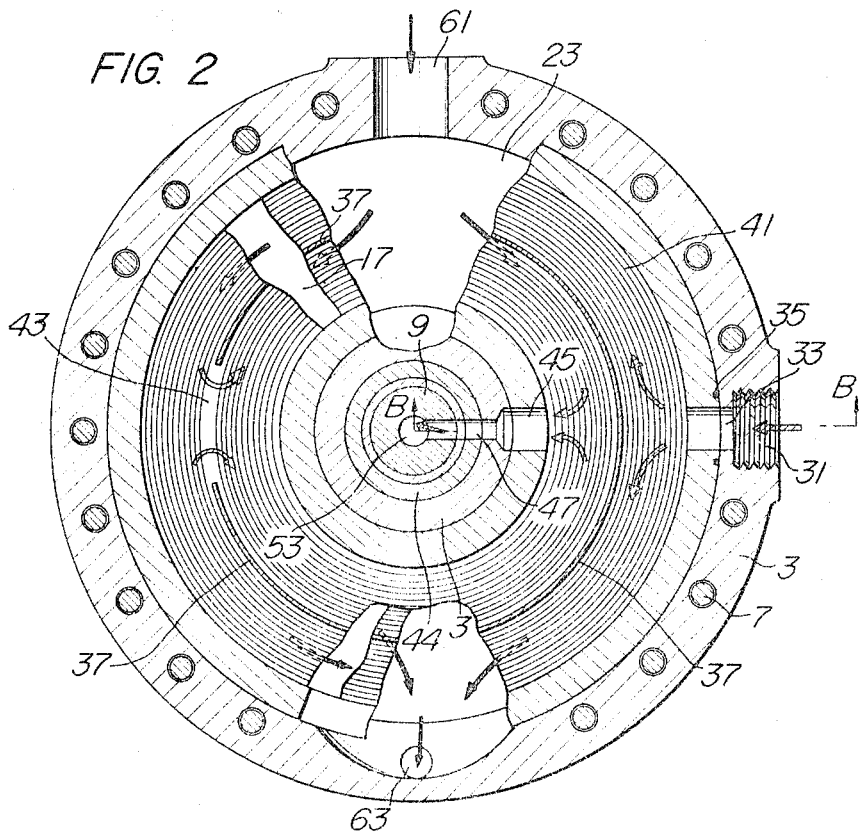
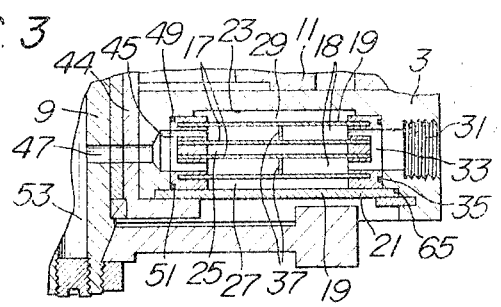

3,289,651
COOLING DEVICE FOR ROTARY PISTON ENGINES

Seizo Jinno, Nagahama-shi, Japan, assignor to Yanmar Diesel Engine Co., Ltd., Osaka, Japan, a corporation of Japan
Filed Dec. 2, 1964, Ser. No. 415,243
Claims priority, application Japan, Dec. 10, 1963, 38/66,083
3 Claims. (Cl. 123—8)

This invention relates to water-cooled rotary piston engines and proposes to arrange the lubricant oil heat exchanger customarily used with such engine in the engine body itself.

Rotary piston engines with which the present invention is concerned are of the type comprised of an engine casing and a substantially triangular piston mounted therein for planetary motion about the axis of the engine shaft. The engine casing includes a center housing having an inner peripheral wall profiled parallel to a two-lobed epitrochoid and two parallel side housings lying on the opposite sides of the center housing. As compared with conventional reciprocatory piston engines, rotary piston engines of the type described generally have an extremely limited working volume per unit output. Also with this type of engine, the piston, through which the energy of the working fluid is converted into mechanical engine output, is subjected to a high thermal load and it is customary to cool the piston by introducing lubricant oil therein. This necessitates use of an appropriate heat exchanger for engine lubricant.

Such heat exchanger is required to have a high exchange rate for the bulk of the engine body when compared with that used with ordinary reciprocatory piston engines and thus it is highly desirable to provide a heat exchanger for lubricant oil which is compact and highly efficient.

Again, with engines of the type concerned, the heat exchanger for lubricant oil has usually been arranged independently from the engine body and has required a substantial proportion of the entire space required to accommodate engine accessories including the heat exchanger. This has apparently been detrimental to the important feature of this type of engine that it is powerful for its size.

The present invention has for its object to obviate this difficulty met with previous rotary combustion engines and proposes to incorporate in the engine a highly efficient flat type lubricant heat exchanger, shaped to the engine configuration, in a neat and compact manner.

It will be readily understood that the present invention is not only applicable to Otto type rotary piston engines having a carburetor and spark plugs but also to Diesel type rotary piston engines in which fuel is injected for compression ignition, though the two types more or less differ from each other in engine construction.

The present invention will further be described with reference to the accompanying drawings, which illustrate one embodiment of the invention and in which:

FIG. 2 is a transverse cross-sectional view with parts broken away of the engine taken along the line A—A in FIG. 1; and FIG. 3 is a fragmentary cross-sectional view taken along the line B—B in FIG. 2.

Figure 1:
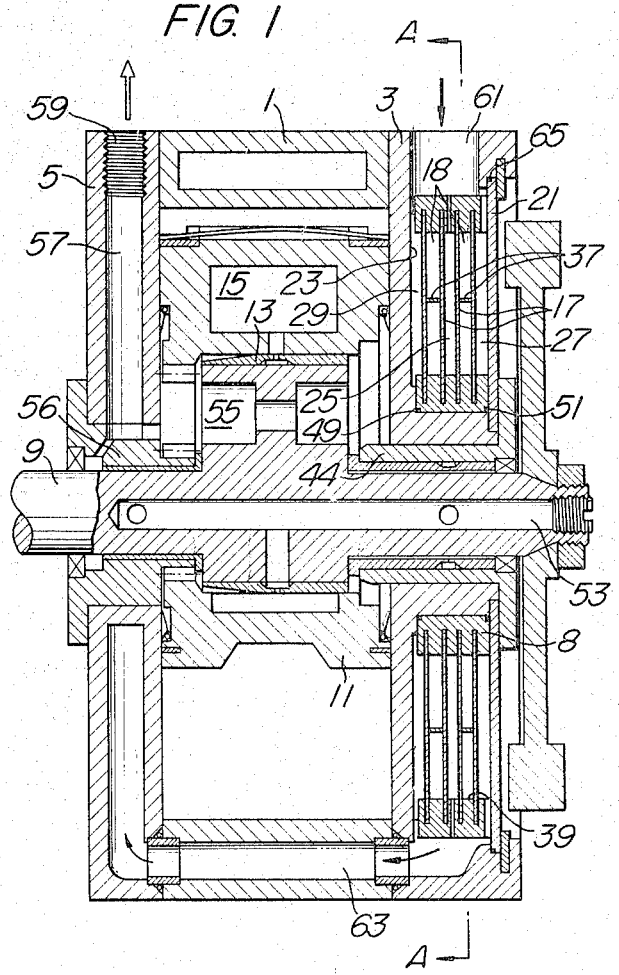
FIG. 1 is a longitudinal cross-sectional view of a rotary piston engine incorporating a cooling device according to the present invention.

Referring to the drawings and first to FIG. 1, the engine illustrated includes a casing comprised of a center housing 1 and two side housings 3 and 5 arranged on opposite sides thereof in parallel with each other, one of the side housings 3 having a cooling water passage with a lubricant heat exchanger core arranged therein.

The center housing 1 has an inner peripheral wall which has a profile approximating an epitrochoid and the side housings 3 and 5 are secured to the opposite sides of the center housing by means of bolts 7 (FIG. 2). An engine shaft 9 is mounted in the casing constructed as described above on an axis extending through the center of symmetry of the epitrochoidal center housing. A piston 11 is housed in the casing and mounted eccentrically on the engine shaft so that the apices of the rotor are maintained in sliding contact with the epitrochoidal inner peripheral wall of the center housing. As illustrated, the shaft 9 has an eccentric portion on which the piston 11 is mounted through the intermediary of a piston bearing member 13 and is formed therein with a cavity 15. In operation, the piston is subjected to intense heat, which is transmitted to the bearing member 13. Lubricant oil cooled in the heat exchanger is circulated through the cavity 15 in the piston to cool it so that the bearing member 13 is maintained at a temperature level not exceeding the temperature allowable to the member.

The lubricant heat exchanger includes one or more cooling elements stacked in spaced parallel relation to each other and each including cooling walls 17 and 19. The side housing 3, in which the heat exchanger is arranged, has a cooling wall 23 and a closure plate 21 on opposite sides of the heat exchanger.

Cooling water is directed through annular spaces 25, 27 and 29 defined respectively between the cooling walls 17 of the adjacent cooling elements, between the closure plate 21 and the outer cooling wall 19 (FIG. 3) of the outermost cooling element, and between the cooling wall 23 of the side housing and the inner cooling wall 19 of the innermost cooling element and thus cools the lubricant oil flowing through the interior of the cooling elements and also the side housing 3.

Referring to FIGS. 2 and 3, lubricant oil is drawn from a lubricant tank (not shown) by an oil pump (also not shown) and directed through an oil inlet 31 formed in the side housing 3 to enter the oil inlet port 33 of the heat exchanger. In order to prevent any leakage into the cooling water passage of the lubricant oil fed under substantial pressure, oil sealing gaskets 35 are arranged in the contact area between the oil inlet 31 and the inlet port 33 of the heat exchanger.

The lubricant oil entering the heat exchanger through the inlet port 33 is directed circumferentially through oil passageways 41 which are each defined by the peripheral wall of the associated cooling element and one or more annular baffles 37 coaxially arranged between the cooling walls thereof. The oil passageways 41 each have a multitude of closely spaced fins arranged therein. As illustrated, the annular baffles 37 each have a gap 43 and each of the oil passageways 41 includes an outer and an inner circular passage interconnected by the gap 43, through which oil flows radially inwardly into the inner circular passage to flow in a direction opposite to that in the outer passage. At a point diametrally opposite to the gap 43, the oil flows radially inwardly to leave the heat exchanger through its outlet port 45. The outlet port 45 is in direct communication with a radial bore 47 extending through the side housing 3 and the adjacent main bearing 44 for the engine shaft. Again, oil sealing gaskets 49 and 51 are arranged in the contact area between the outlet port 45 and radial bore 47 for the purpose of preventing any oil leakage into the cooling water passage.

The lubricant oil cooled in this manner flows through the radial bore 47 and through an oil passage 53 formed axially through the engine shaft 9 to enter the rotor cavity 15 through the rotor bearing 13 for cooling the rotor 11.

The lubricant oil after having cooled the rotor flows into a cylindrical space 55 defined between the rotor and the side housing 5 and further proceeds through a radial passage 57 extending through the adjacent main bearing 56 and side housing 5 to flow out through oil outlet 59.

On the other hand, cooling water flowing from a water pump (not shown) is directed through a cooling water inlet opening 61 formed in the side housing 3 in a state having a maximum heat-absorbing capacity to flow circumferentially through the annular spaces 25, 27 and 29 described hereinbefore to cool the cooling elements of the heat exchanger and the side housing 3. The cooling water then leaves the side housing 3 through a junction port 63 formed between the center and side housing 1 and 3 to cool the center housing 1 and the opposite side housing 5 by flowing therethrough in succession or simultaneously in parallel. In addition, the closure plate 21 is provided with a gasket 65 which serves together with the aforesaid gasket 51 to prevent any leakage of cooling water to the outside.

One form of heat exchanger usable with the present invention has been shown and described which has a circular configuration, but it is to be understood that the present invention is not limited to the particular configuration of heat exchanger but is applicable to any other configuration as long as the heat exchanger can be arranged in the cooling water passage formed in the side housing.

What is claimed is:

1. In a rotary piston engine of the type including a casing comprised of a center housing having an inner peripheral wall profiled parallel to a two-lobed epitrochoid and side housings arranged on opposite sides of said center housing and a generally triangular piston mounted in said casing for planetary motion therein, a cooling device characterized in that at least one of said side housings has a cooling water passage formed therein, a lubricant heat exchanger core arranged in said passage and including at least one cooling element disposed in a manner so that said lubricant heat exchanger core is cooled by the cooling medium being circulated through the associated side housing for forced cooling thereof.

2. In a rotary piston engine of the type including a casing comprised of a center housing having an inner peripheral wall profiled parallel to a two-lobed epitrochoid and side housings arranged on opposite sides of said center housing and a generally triangular piston mounted in said casing for planetary motion therein, a cooling device characterized in that at least one of said side housings has a cooling water passage formed therein, a lubricant heat exchanger core arranged in said passage and including at least one cooling element disposed in a manner so that said lubricant heat exchanger core is cooled by the cooling medium being circulated through the associated side housing for forced cooling thereof, said lubricant heat exchanger core being formed in the outer periphery with an oil inlet port and in the inner periphery with an oil outlet port and having arranged in the cooling element an annular baffle designed to cause lubricant oil entering the cooling element to flow circumferentially and radially inwardly, the cooling water entering the side housing being directed to flow circumferentially in parallel with the cooling element.

3. In a rotary piston engine of the type including a casing comprised of a center housing having an inner peripheral wall profiled parallel to a two-lobed epitrochoid and side housings arranged on opposite sides of said center housing and a generally triangular piston mounted in said casing for planetary motion therein, a cooling device characterized in that one of said side housings has a cooling water passage formed therein, a lubricant heat exchanger core arranged in said passage and including at least one cooling element disposed in a manner so that said lubricant heat exchanger is cooled by the cooling medium being circulated through the associated side housing for forced cooling thereof, and that the side housing incorporating said lubricant heat exchanger is formed with a cooling water inlet for introducing the entire flow of engine cooling water into the side housing and a cooling water outlet for introducing said cooling water into the center housing and the other side housing.

References Cited by the Examiner

FOREIGN PATENTS 1,011,477   12/1965   Great Britain.

MARK NEWMAN, *Primary Examiner.*

F. T. SADLER, *Assistant Examiner.*